(12) United States Patent
Miller

(10) Patent No.: US 7,258,538 B2
(45) Date of Patent: Aug. 21, 2007

(54) APPARATUS FOR BLOW MOLDING

(75) Inventor: Paul Alan Miller, Cement City, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 331 days.

(21) Appl. No.: 11/050,493

(22) Filed: Feb. 2, 2005

(65) Prior Publication Data

US 2006/0172035 A1    Aug. 3, 2006

(51) Int. Cl.
*B29C 49/48* (2006.01)
(52) U.S. Cl. .................. 425/182; 425/195; 425/522; 425/541; 249/102
(58) Field of Classification Search ............... 425/182, 425/195, 522, 541; 249/102
See application file for complete search history.

(56) References Cited

U.S. PATENT DOCUMENTS

| 1,881,088 | A | * | 10/1932 | Matuschka | ............ 249/102 |
| 1,884,590 | A | * | 10/1932 | Davies | ........... 425/DIG. 30 |
| 3,912,435 | A | * | 10/1975 | Waring | ............ 425/541 |
| 3,914,101 | A | * | 10/1975 | Stefanka | ............ 425/522 |
| 4,151,976 | A | | 5/1979 | Schurman | |
| 4,815,960 | A | | 3/1989 | Rudolf | |
| 5,255,889 | A | * | 10/1993 | Collette et al. | ........... 249/102 |
| 5,411,699 | A | | 5/1995 | Collette et al. | |
| 5,421,544 | A | | 6/1995 | Roop | |
| 5,968,560 | A | | 10/1999 | Briere et al. | |
| 6,428,302 | B1 | * | 8/2002 | Tsau | ........... 425/522 |

FOREIGN PATENT DOCUMENTS

GB         2240300 A   *   7/1991

\* cited by examiner

*Primary Examiner*—Robert B. Davis
(74) *Attorney, Agent, or Firm*—John W. Gregg

(57) ABSTRACT

A mold assembly for blow molding comprises first and second mating mold components, each mating mold component comprising molding surfaces open to a mating face of the mold component and defining the exterior of an article to be molded from a tubular parison and at least one height insert, the height and number of height inserts selected according to a desired longitudinal extension of the article to be molded, each height insert being retained in the mating mold component by retaining means retained with the mold component during insertion and removal of the height insert. A blow molding machine comprises a press mechanism for operating a mold assembly and a mold assembly according to the invention mounted thereto.

18 Claims, 4 Drawing Sheets

APPARATUS FOR BLOW MOLDING

I. BACKGROUND OF THE INVENTION

1. Field of the Invention

This invention relates generally to blow molding. In particular, this invention relates to mold assemblies for blow molding.

2. Description of Related Art

Blow molding is a cyclic process wherein a parison of material in a moldable condition is centered on the parting plane of a mold assembly, the mold assembly is closed around the parison, the parison is expanded so the exterior of the parison abuts molding surfaces defined by the closed mold assembly, the blow molded article is conditioned to be sufficiently rigid to retain its size and shape while unsupported, the mold assembly is opened and the blow molded article is removed. In general, the moldable condition of the parison is achieved when the material of the parison is at an elevated temperature, and the rigid condition of the blow molded article is achieved when the temperature of the material has been reduced. A blow molding machine comprises a press for opening and closing the mold assembly and blowing means for introducing a pressurized fluid (typically air) to expand the parison in the mold assembly. Alternative types of blow molding equipment produce blow molded containers from preformed parisons typically produced by injection molding away from the press (so called "two-stage" blow molding) and from parisons extruded at the blow molding press (so called "single-stage" blow molding). Two stage blow molding machines typically include means for mechanically stretching the parison longitudinally during blow molding. Additionally, blow molding machines may comprise means for handling the molded article upon removal from the mold assembly, means for trimming waste from the molded article (single-stage machines only), and heat transfer devices to elevate the temperature of the parison to achieve the moldable condition and to reduce the temperature of the blow molded article to achieve the rigid condition.

Blow molding is commonly used for production of containers wherein the blow molded article comprises a body portion defining a closed end and a neck portion connecting the body and a mouth opening for filling the container and dispensing the contents therefrom. Advantageously, the neck portion of the container comprises an exterior surface having a feature, such as a thread, called the "neck finish" for engaging a separable closure. In two-stage blow molding, the neck finish is completed during production of the preformed parison, and in single-stage blow molding, the neck finish is formed by mold components upon closure around the extruded parison. Mold assemblies for blow molding containers comprise mating mold components wherein molding surfaces open to the mating faces of the mold components define the exterior of the container. To accommodate containers having a range of volume compatible with a particular mold assembly, each mold component advantageously comprises a replaceable height insert between the neck portion and closed end and defining the longitudinal extent of the article to be molded. In known mold assemblies, disassembly of the mold component is required to insert or remove the height insert, including removal of fasteners used to retain the height insert in the mold component. Hence, there is a continuing need for mold components comprising height inserts which may be removed or installed without removal of other elements of the mold component.

II. SUMMARY OF THE INVENTION

It is an object of the present invention to provide a mold assembly for blow molding comprising mating mold components having molding surfaces open to mating faces thereof and at least one height insert, the height of and number of height inserts being selected according to a desired longitudinal extension of the article to be molded, each height insert being retained in the mating mold component by retaining means retained with the mold component during insertion and removal of the height insert.

It is a further object of the present invention to provide a blow molding machine comprising a press mechanism for operating a mold assembly mounted thereto, the mold assembly comprising mating mold components having molding surfaces open to mating faces thereof and at least one height insert, the height of and number of height inserts being selected according to a desired longitudinal extension of the article to be molded, each height insert being retained in the mating mold component by retaining means retained with the mold component during insertion and removal of the height insert.

Further objects and advantages of the invention shall be made apparent from the accompanying drawings and the following description thereof.

In accordance with the aforesaid objects the present invention provides a mold assembly for blow molding comprising first and second mating mold components, each mating mold component comprising molding surfaces open to a mating face of the mold component and defining the exterior of an article to be molded from a tubular parison and at least one height insert, the height and number of height inserts selected according to a desired longitudinal extension of the article to be molded, each height insert being retained in the mating mold component by retaining means retained with the mold component during insertion and removal of the height insert. A blow molding machine comprises a press mechanism for operating a mold assembly and a mold assembly according to the invention mounted thereto.

III. BRIEF DESCRIPTION OF THE DRAWINGS

FIGS. 1*a* and 1*b* illustrate a preformed parison and finished container, respectively, of a two-stage blow molding process.

Figure 3:
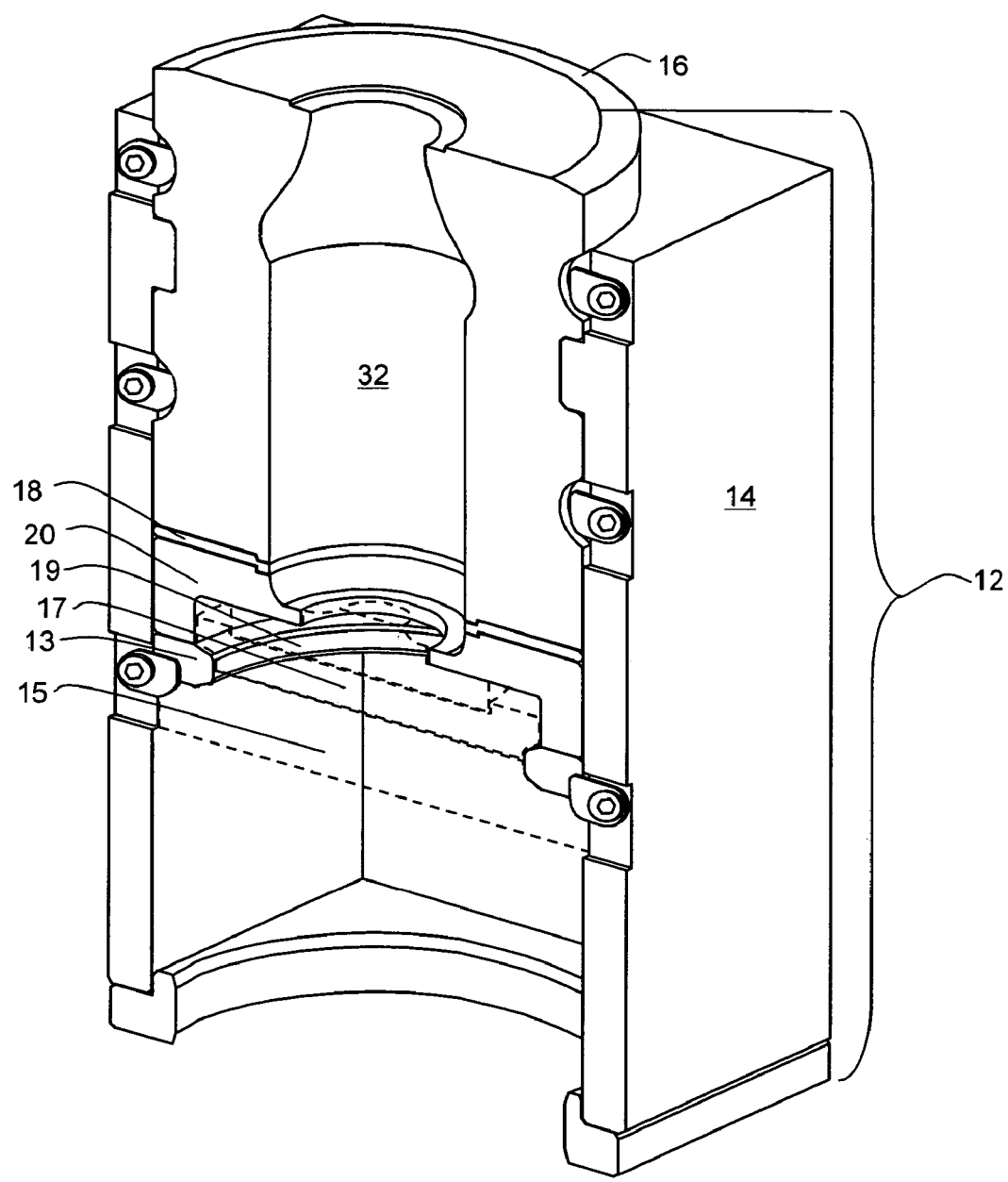
FIG. 3 is a three dimensional of view of a mold component of FIG. 2.
Figure 4A:
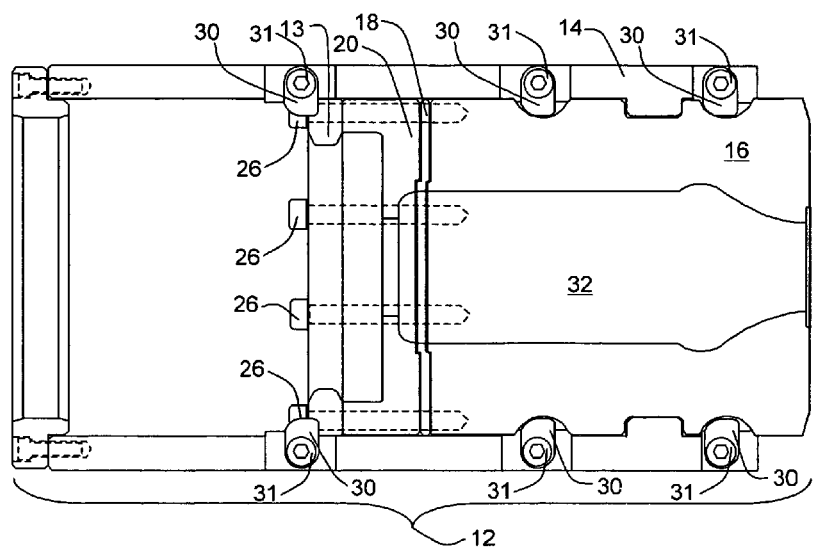
Figure 4B:
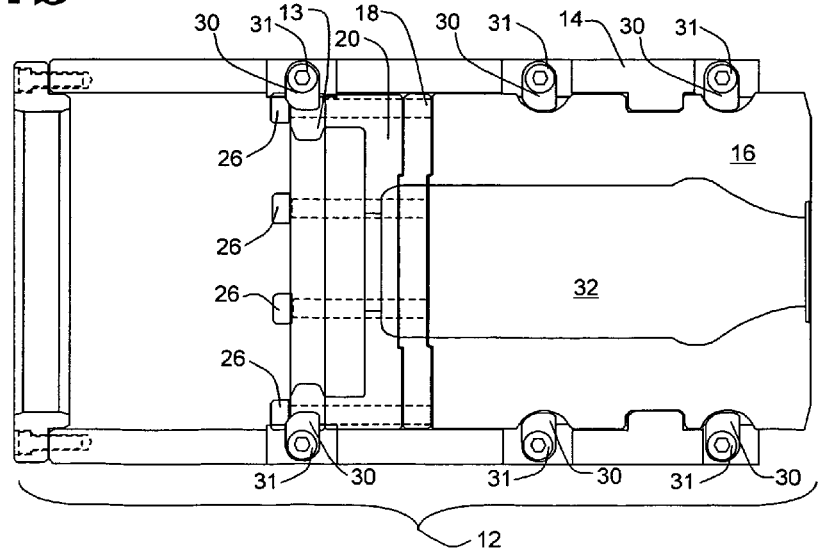

FIGS. 4*a* and 4*b* are top views of the mold component of FIG. 3 shown with height inserts of different sizes.

Figure 5:
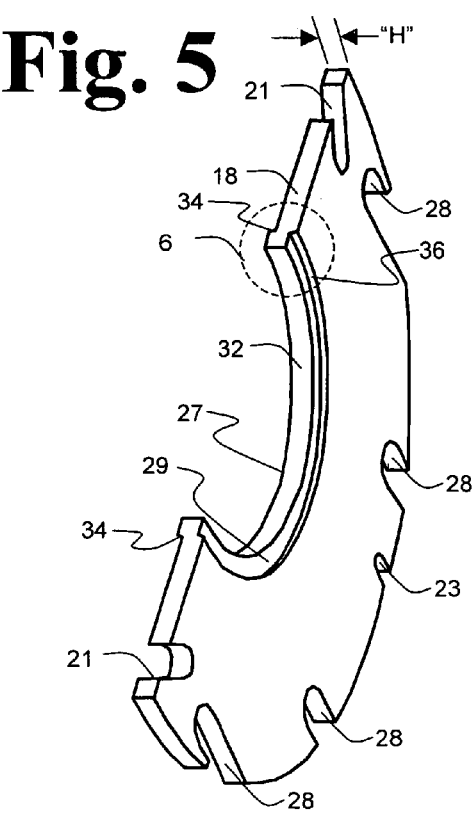

FIG. 5 is a three dimensional view of a height insert in accordance with the invention.

Figure 6:
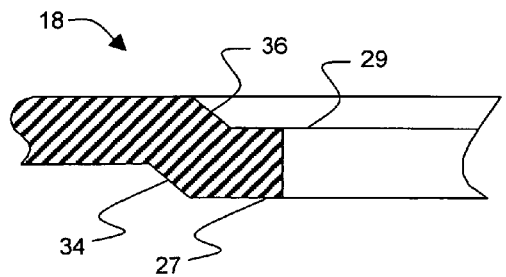

FIG. 6 is a partial cross section of the detail 6 of the height insert of FIG. 5.

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
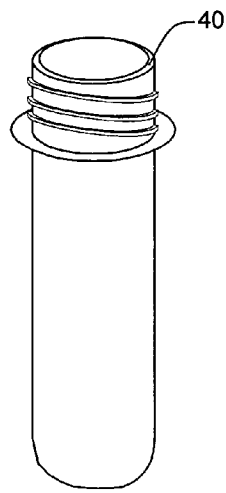
Figure 1B:
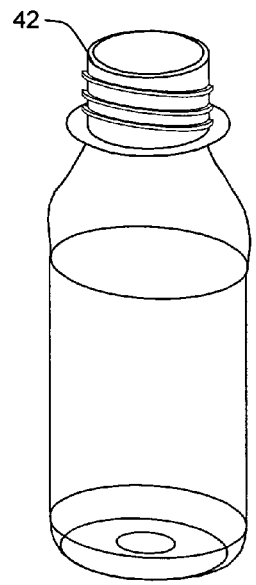

A two-stage blow molding process expands a preformed parison, typically including a completed neck finish, to produce a finished container, a preformed parison 40 shown in FIG. 1a and a container 42 blow molded therefrom shown in FIG. 1b. Preformed parison 40 is typically produced by injection molding. In preparation for blow molding, the material of preformed parison 40 is typically conditioned (heated) to be made deformable. A mold assembly is closed around the conditioned, preformed parison and blow molding commences with closure of the mold assembly. During blow molding, pressurization of preformed parison 40 is advantageously accompanied by mechanical stretching along the length of preformed parison 40 to produce container 42. Following expansion, the material of container 42 is conditioned (cooled) to become sufficiently rigid for removal from the mold assembly.

Figure 2:
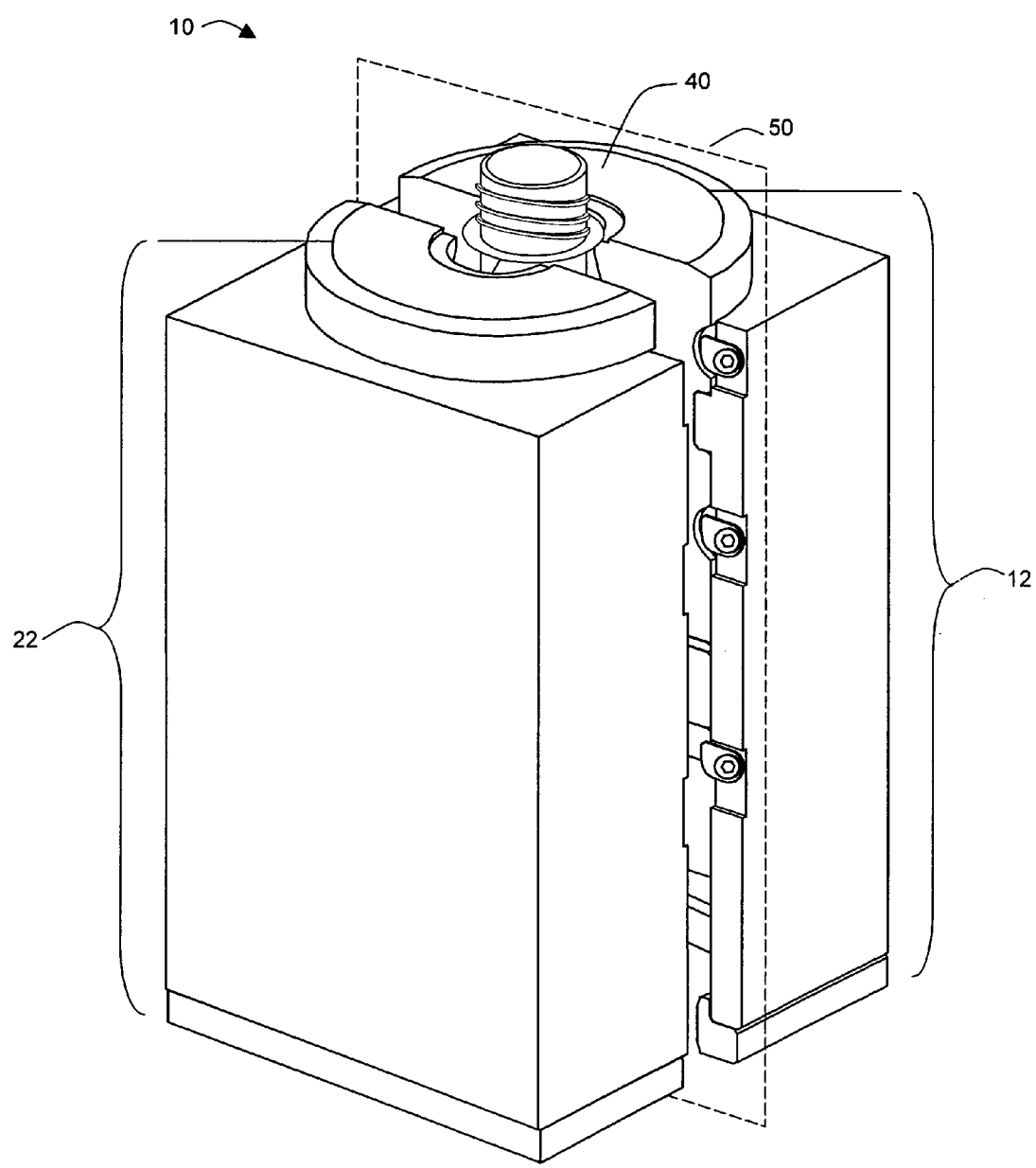
FIG. 2 is a three dimensional view of a mold assembly comprising a mold component according to the invention.

Referring to FIG. 2, mold assembly 10 comprises mating mold components 12 and 22 each referred to herein as a "mold half". Each of mold components 12 and 22 is carried by a member of a molding machine press (not shown) for translating the mold components between open and closed positions relative to each other (the relative position depicted in FIG. 2 is between the fully open and fully closed positions). In the open position, mold components 12 and 22 are separated permitting admission of a parison such as parison 40 therebetween and removal of a molded article upon completion of a molding operation. In the closed position, mating faces of mold components 12 and 22 abut at parting plane 50, the abutting faces of mold components 12 and 22 having molding surfaces thereon defining a cavity. Parison 40 is tubular, and as shown in FIG. 2, comprises a completed neck finish as is known in two-stage blow molding. While the invention is suitable for use with single-stage blow molding, the preferred embodiment will be described with reference to a two-stage blow molding process. Parison 40 is preformed with an open mouth and a closed end (not shown) disposed opposite the open mouth. The wall thickness, diameter and length of parison 40 are chosen in accordance with properties of the material from which it is produced and the extent of expansion to be effected both axially and radially during blow molding. With the molds closed surrounding the parison, the parison is pressurized to expand the parison material to abut the molding surfaces of the cavity, and in some instances, mechanically stretched longitudinally by introduction of a stretch rod or the like through the parison mouth as is known. Containers produced using mold assembly 10 advantageously comprise neck portions having surface features formed thereon such as the threads shown in FIG. 2 for engaging a container closure.

Referring to FIG. 3, mold component 12 comprises shell 14 supporting mold inserts 16 and 20, all of mold inserts 16 and 20 and height insert 18 comprising molding surfaces 32 of the cavity defining the body of the container to be blow molded. A mold base 19 (shown in phantom (dashed line) in FIG. 3) comprises molding surfaces defining at least a portion of the closed end of the container and is mounted to mold insert 20 by base support 17 and support retainer 15 (both shown in phantom (dashed line) in FIG. 3). Advantageously, concavity of the closed end of container 42 is provided by the molding surfaces of mold base 19. Base support 17 and support retainer 15 are fastened together by bolts or the like (not shown). The periphery of the thus assembled base support 17 and support retainer 15 engage the projection of locating ridge plate 13. Mold inserts 16 and 20 together with height insert 18 establish the longitudinal extent of the body of the container to be produced. With height insert 18 omitted, mold inserts 16 and 20 establish the longitudinal extent of the body of the container to be produced.

Referring to FIGS. 4a and 4b, mold component 12 is shown with height inserts 18 of two different heights "H" (see FIG. 5), illustrating the change in longitudinal extent effected by use of such height inserts. Mold inserts 16 and 20 are joined by fasteners such as bolts 26 (shown partially hidden (dashed line) in FIGS. 4a and 4b) passing through locating ridge plate 13, mold insert 20, and the gap between mold inserts 16 and 20. Threaded ends of bolts 26 engage threads in mold insert 16. With assembly of base support 17 and support retainer 15 to engage the projection of locating ridge plate 13 (see FIG. 3), bolts 26 clamp mold base 19 (see FIG. 3) to mold insert 20. The joining of mold base 19 with mold inserts 16 and 20 creates a mold insert sub-assembly. The mold insert sub-assembly is seated against shell 14 and retained therewith by, for example, rotatable tabs 30 clamped in position by fasteners such as bolts 31. Alternatively, shell 14 and mold insert 16 can comprise a unitary construction to which mold insert 20, mold base 19, base support 17 and locating ridge plate 13 are joined.

Continuing with reference to FIGS. 4a and 4b, height insert 18 comprises slots 28 equal in number to the number of bolts 26 and open to the periphery of height insert 18. Slots 28 are located to align with the shafts of bolts 26 passing through the gap between mold inserts 16 and 20. As slots 28 are open to the periphery of height insert 18, height insert 18 may be withdrawn from or inserted into the gap between mold insets 16 and 20 from the face side of mold component 12 without removal of bolts 26. Bolts 26 comprise retaining means for retaining height insert 18 in mold component 12, bolts 26 enabling adjustment of the height of the gap between mold inserts 16 and 20 and permitting clamping of mold inserts 16 and 20 against height insert 18. Advantageously, height insert 18 comprises a transverse offset comprising offset surfaces proximate the face for engaging mating surface features of mold inserts 16 and 20. As seen in FIG. 5, the offset surfaces comprise boss 27 projecting from the bottom of height insert 18 and recess 29 descending into the top of height insert 18, each of boss 27 and recess 29 having an arcuate periphery intersecting the portion of the face of height insert 18 comprising molding surface 32. Rear wall 36 of recess 29 is hence arcuate, as is rear wall 34 of boss 27. With height insert 18 inserted in the gap, boss 27 and recess 29 engage mating surface features of mold inserts 16 and 20 as the mold inserts 16 and 20 are moved toward each other with bolts 26. Rear walls 34 and 36 of boss 27 and recess 29, respectively seat against mating walls of the mating recess and mating projection of mold inserts 20 and 16. The interfitting of the projection of mold insert 16 with recess 29 and of the recess of mold insert 20 with boss 27 retain height insert 18 in the mold insert subassembly by the clamping action effected by bolts 26. Seating of arcuate walls 34 and 36 against mating malls of mold inserts 16 and 18 locates the molding surfaces 32 comprising height insert 18 concentrically with the longitudinal axis of the cavity defining the body of container 42. With height insert 18 omitted from the mold insert subassembly, the surfaces of mold inserts 16 and 20 intended for mating with boss 27 and recess 29 are seated together, likewise effecting concentric alignment of the molding surfaces 32 comprising mold inserts 16 and 20 with the longitudinal axis of the cavity defining the body of container 42.

Referring to FIG. 5, height insert 18 advantageously comprises locating slot 23 open to the periphery of height insert 18 for engaging a locating dowel (not shown) projecting into the gap between mold inserts 16 and 20. A locating dowel is used in connection with blow molding of non-symmetrical containers requiring unique height inserts for mold components 12 and 22 and, together with mating locating slot 23 keys the installation of height insert 18 into a particular one of mold components 12 and 22, whereby incorrect installation of the unique inserts for each of mold components 12 and 22 is prevented.

Continuing with reference to FIG. 5, height insert 18 comprises engaging slots 21 open to the height insert periphery at the face side thereof and spaced apart from the portion of the face side comprising molding surface 32. Engaging slots 21 are useful for engaging height insert 18 to assist with its insertion in or withdrawal from the gap between mold inserts 20 and 16. Removal and/or replacement of height insert 18 from the mold insert sub-assembly is accomplished by loosening bolts 26, that is backing bolts 26 in the direction away from mold insert 16, to allow mold insert 20 to be moved away from mold insert 16 so that the offset of height insert 18 may be separated from the mating surface features of mold inserts 16 and 20. With a mold insert sub-assembly mounted in shell 14, tabs 31 retaining locating ridge plate 13 in position in shell 14 are loosened to allow movement of locating ridge plate 13 and mold insert 20. Height insert 48 may then be withdrawn from the face side of mold component 12. If a replacement height insert 18 is to be inserted, the gap between mold inserts 16 and 20 is adjusted to accommodate the overall height of the replacement height insert 18, including the offset, and the replacement height insert 18 is inserted into the gap from the face side of mold component 12. The gap between mold inserts 16 and 20 is then closed by tightening bolts 26 so that the offset of height insert 18 is seated against the mating surface features of mold inserts 16 and 20. Advantageously, walls 34 and 36 of boss 27 and recess 29 are inclined as shown in FIG. 6 rather than being perpendicular to the top and bottom of height insert 18, the inclination facilitating seating of walls 34 and 36 with mating walls of mold inserts 16 and 20 as well as removal of height insert 18 after opening of the gap.

While the invention has been illustrated and described with reference to the preferred embodiment of the figures, it is not intended that the scope of the invention be defined by the preferred embodiments. In particular, it is contemplated that the fasteners joining mold inserts 16 and 20 may be other than bolts 26, and may comprise, for example, studs attached to mold insert 16 and having threaded ends projecting beyond projecting ridge plate 13 and engaging nuts thereon, the nuts allowing adjustment of the gap between mold insert 16 and 20. Alternatively, the fasteners may comprise cam action fasteners of two components where each component is retained by one of mold inserts 16 and 20, the cam action clamping mold inserts 16 and 20 against height insert 18. In addition, while the preferred embodiment illustrates height inserts of different heights, a difference in longitudinal extension could as well be achieved by stacking plural height inserts 18, each of the same height, in the gap between mold inserts 16 and 20.

What is claimed is:

1. A mold assembly for blow molding comprising first and second mating mold components, each mating mold component comprising molding surfaces open to a mating face of the mold component and defining the exterior of an article to be molded from a tubular parison, first and second mold inserts comprising molding surfaces and being joined by at least one fastener and at least one height insert comprising molding surfaces and received in a gap of adjustable height between the first and second mold inserts, the gap being adjusted by adjustment of the fasteners, the height of and number of height inserts selected according to a desired longitudinal extension of the article to be molded, each height insert being retained in the mating mold component by at least one of the fasteners joining the first and second mold inserts, the fasteners retaining the height inserts being retained with the mold component during insertion and removal of the height insert.

2. The mold assembly according to claim 1 wherein the article to be molded comprises a neck portion and a base portion and the height insert comprises molding surfaces defining a segment between the neck portion and the base portion.

3. The mold assembly according to claim 2 wherein the height insert further comprises a number of slots equal to the number of fasteners, each slot open to the periphery of the height insert and located to align with a fastener when the height insert is inserted in the gap.

4. The mold assembly according to claim 3 wherein the height insert further comprises a transverse offset proximate the face side thereof and defined by surfaces offset from the top and bottom of the insert, the offset surfaces engaging mating surfaces of the mold inserts effective to retain the height insert in the gap.

5. The mold assembly according to claim 4 wherein the offset comprise a recess descending into one of the top and bottom of the height insert and a boss projecting from the other the other of the top and bottom of the height insert and wherein each of the mold inserts has a mating surface feature for engaging one of the boss and recess.

6. The mold assembly according to claim 5 wherein the fasteners are effective to clamp the height insert between the mold inserts to retain the height insert within the gap when the mating surfaces of the mold inserts are engaged with the recess and boss.

7. The mold assembly according to claim 5 wherein each of the boss and recess are arcuate and comprise a rear wall, and the mating surfaces of each mold insert comprises a mating wall, the rear wall of each of the boss and recess seating against a mating wall of the engaging mold insert when the height insert is clamped between the mold inserts.

8. The mold assembly according to claim 2 wherein the height inserts for a particular one mold component each further comprise a locating slot open to the periphery of the height insert for engaging a locating dowel projecting into the gap, the locating dowel and locating slot keying the height insert for installation into the particular one of the mold components.

9. The mold assembly according to claim 2 wherein the height insert further comprises at least one engaging slot open to the face side of the height insert and spaced apart from the portion thereof comprising the molding surfaces, the engaging slot useful for engaging the height insert from the face side of the mold component.

10. A blow molding machine comprising a press and mating mold components of a mold assembly mounted to members of the press, each mating mold component comprising molding surfaces open to a mating face of the mold component and defining the exterior of an article to be molded from a tubular parison, first and second mold inserts comprising molding surfaces and being joined by at least one fastener and at least one height insert comprising molding surfaces and received in a gap of adjustable height between the first and second mold inserts, the gap being adjusted by adjustment of the fasteners, the height of and number of height inserts selected according to a desired longitudinal extension of the article to be molded, each height insert being retained in the mating mold component by at least one of the fasteners joining the first and second mold inserts, the fasteners retaining the height inserts being retained with the mold component during insertion and removal of the height insert.

11. The molding machine according to claim 10 wherein the article to be molded comprises a neck portion and a base portion and the height insert comprises molding surfaces defining a segment between the neck portion and the base portion.

12. The molding machine according to claim 11 wherein the height insert further comprises a number of slots equal to the number of fasteners, each slot open to the periphery of the height insert and located to align with a fastener when the height insert is inserted in the gap.

13. The molding machine according to claim 12 wherein the height insert further comprises a transverse offset proximate the face side thereof and defined by surfaces offset from the top and bottom of the insert, the offset surfaces engaging mating surfaces of the mold inserts effective to retain the height insert in the gap.

14. The molding machine according to claim 13 wherein the offset comprise a recess descending into one of the top and bottom of the height insert and a boss projecting from the other of the top and bottom of the height insert and wherein each of the mold inserts has a mating surface feature for engaging one of the boss and the recess.

15. The molding machine according to claim 14 wherein the fasteners are effective to clamp the height insert between the mold inserts to retain the height insert within the gap when the mating surfaces of the mold inserts are engaged with the recess and boss.

16. The molding machine according to claim 14 wherein each of the boss and recess are arcuate and comprise a rear wall, and the mating surfaces of each mold insert comprises a mating wall, the rear wall of each of the boss and recess seating against a mating wall of the engaging mold insert when the height insert is clamped between the mold inserts.

17. The molding machine according to claim 11 wherein the height inserts for a particular one of the mold components each further comprises a locating slot open to the periphery of the height insert for engaging a locating dowel projecting into the gap, the locating dowel and locating slot keying the height insert for installation into the particular one of the mold components.

18. The molding machine according to claim 11 wherein the height insert further comprises at least one engaging slot open to the face side of the height insert and spaced apart from the portion thereof comprising the molding surfaces, the engaging slot useful for engaging the height insert from the face side of the mold component.

* * * * *